May 1, 1951  A. NYROP  2,551,042
RENDERING APPARATUS
Filed July 11, 1947
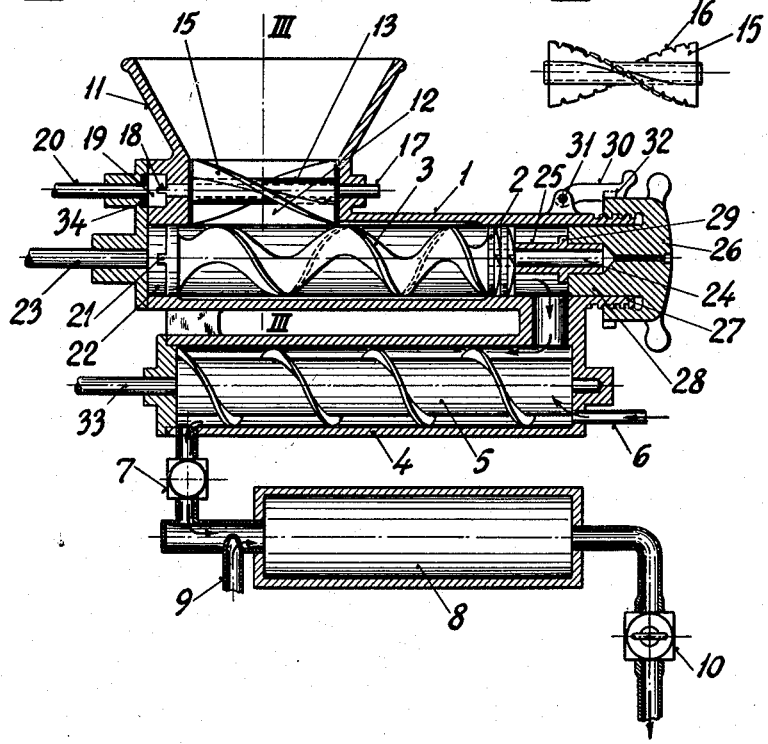
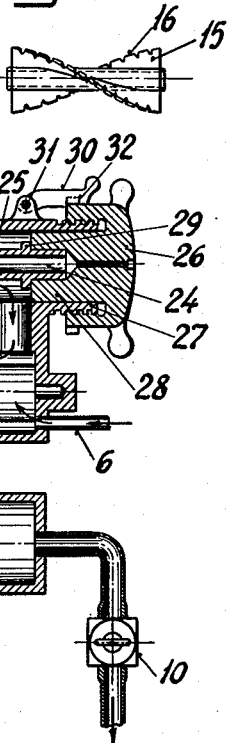
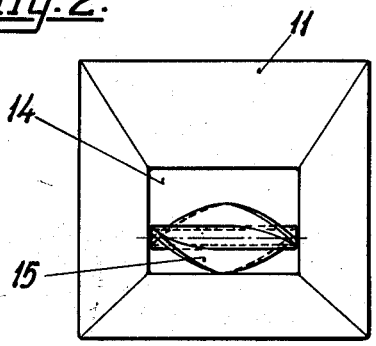
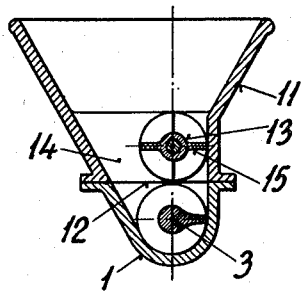
Inventor
Aage Nyrop
By H. B. Willson & Co.
Atty.

Patented May 1, 1951

2,551,042

UNITED STATES PATENT OFFICE 2,551,042

RENDERING APPARATUS

Aage Nyrop, Hellerup, Denmark

Application July 11, 1947, Serial No. 760,304
In Denmark February 25, 1944

Section 1, Public Law 690, August 8, 1946
Patent expires February 25, 1964

5 Claims. (Cl. 23—280)

The present invention relates to an apparatus for continuous rendering of fat or oil from fatty substances.

An apparatus for this purpose is described in the specification to Danish Patent No. 53,328 and comprises a mincer, a heater, a pump, a boiler, a retardation vessel, a pressure release member, and a cyclone.

The material to be rendered is usually of such a consistency that the worm-conveyor, as described in the specification to the said Danish patent, is unable to seize and forward it without manual labour. The feed to the mincer and heaters will vary and cause considerable decrease in capacity, and consequently the rendered product will not be uniform.

The present invention involves an improvement over my prior patent with respect to the feed, working, and other important features of the apparatus.

The rendering apparatus according to my invention includes a rotating feed impeller which continually seizes and charges the material to the worm-conveyor. This impeller is placed at the base of the hopper of the apparatus. The upwardly moving side of the rotating impeller operates close to one side of the hopper, whereas the hopper is open at the other side of the impeller, which side moves downwardly so as to cause the material to be forced downwardly into the worm conveyor in a continuous stream, the mass of which depends on the speed of rotation of the impeller.

Said impeller is provided with vanes tending not only to force the material downwardly into the worm-conveyor, but also move it forward longitudinally to the conveyor. In this manner the impeller and the worm-conveyor both actuate the material to be treated to movement towards the mincing device, by which consumption of power is reduced. In cases where tough material, or material hardened by cooling, is to be handled, the vanes of the impeller may be provided with teeth so as to more effectually seize the material than smooth-edges impeller vanes.

To facilitate cleaning, the impeller should preferably be detachable. To this end the impeller is mounted on a shaft which by means of a pin-coupling or other suitable means is connected to a driving shaft. By pulling the impeller shaft out of engagement with the impeller, the latter may be removed from the hopper. In their assembled position the impeller and shaft are interlocked by adequate locking means.

The mincer and its conveyer should likewise be easily detachable to facilitate their removal, cleaning, and replacement. For this reason the mincer is coupled to its driving shaft in such a manner that it can be pulled out of engagement therewith. When assembled, the mincer is held in position by means of a screw head that can be locked in a position allowing suitable play between the cutters of the mincer.

To provide the best possible mincing effect the present invention involves an improvement over my prior patent with respect to efficiency, capacity, and uniformity in production, and the features and advantages will be apparent from the following more detailed disclosure with reference to the accompanying drawing, in which Fig. 1 is a sectional view of an apparatus illustrating the principle of the invention, Fig. 2 is a top plan view of the hopper showing the location of the impeller in its outlet, Fig. 3 is a vertical section through the hopper showing the positions of the impeller and the worm-conveyer, the plane of the section being indicated by the line III—III in Fig. 1, and Fig. 4 is a side elevation of a modified form of an impeller with tooth-edges vanes.

Referring to the drawing, 1 indicates a housing enclosing a mincer with cutters 2 and a worm-conveyer 3. In this part of the apparatus the mincing of the material to be treated takes place. It will be noted that the cutters are at one end of the worm 3 and adjacent an outlet in the bottom of the housing near one end of the latter, while the other end of the worm is disposed beneath the inlet of the housing. 4 indicates a mixing and heating chamber containing an internal rotary member 5 for mixing the minced material with steam and water suppleid through a pipe 6, to produce a homogeneous mass. The member 5 is shown as a cylinder fixed to a centrally positioned shaft 33 and having helical mixing and feeding vanes on its surface.

A pump 7 forces the pulped material into a boiler 8 in which the pulp is boiled under pressure by means of steam supplied tangentially through an injector pipe 9, thus accelerating the pulp to high rotating velocity. Through a pressure release valve 10 the pulp is blown into a cyclone, not included in the drawing. A hopper 11 is placed on the top of the housing 1, and an impeller is arranged in its outlet immediately above the worm-conveyer 3. The impeller 13 is disposed close to one side wall of the base or outlet portion of the hopper leaving an open space 14 at the opposite side, where the vanes of the impeller 13 moved downwardly, see Fig. 3.

These vanes extend helically along the impeller, and during rotation they seize the material fed into the hopper 11 and force it downwards till engaged by the worm-conveyer 3.

The inclination of the helical vanes will furthermore serve to move the material forwardly longitudinally of the conveyer 3.

As shown in Fig. 4, the edges of the vanes 15 may for special purposes be provided with serrated edges of the vanes 16. Such teeth are preferred when treating hard or slimy material, as they ensure a firm grip of such material and pass it continuously into the worm-conveyer 3.

It is of advantage to have the impeller 13 mounted on a shaft 17 in such a manner that the shaft can be extracted from the impeller, thus allowing the latter to be withdrawn from the hopper. By this arrangement the cleaning of the housing as well as the impeller is facilitated. The shaft 17 is preferably coupled to a driving shaft 20 by means of a suitable pin coupling 18, 19.

To absorb end thrust a thrust bearing 34 is provided.

Furthermore, the mincing and heating units are constructed for easy detachment to facilitate cleaning.

The conveyer 3 and cutters 2 can be extracted when a screw head 26 in a part of the housing is removed. The worm-conveyer 3 is at one end coupled to a driving shaft 23 by means of a suitable pin coupling 21, 22, whereas at the other end it is provided with a short shaft 24 carrying the cutters 2, and encircled by a bushing 25 journaled in a boring in the screw head 26 when this member is screwed into the threaded end 27 of the housing 1. The bushing 25 has an annular flange 29 that is engaged by the screw head 26 for displacement of the bushing to hold the cutters 2 and the coupling 21, 22 in position. By this arrangement the proper adjustment of the cutters 2 is easily determined. When the parts are assembled the screw head is tightened as much as possible, and later released slightly to provide a suitable play between the cutters.

After correct adjustment of the screw head 26 it is locked in position by means of a hook 30 on a pivot 31, which hook engages one of several notches 32 on the rim of the head 26.

The shafts 20, 23, and 33 may in any appropriate manner be coupled together by driving means, which, however, is not disclosed in the drawing.

By means of the above described apparatus a continuous and uniform feeding of material within the apparatus is attained, and consequently the capacity thereof is increased. The rendered fat, which is subsequently separated, will be uniform and of high quality. Much manual work is avoided.

It is obvious that modifications are possible without departing from the scope of the invention as defined in the following claims.

I claim:

1. An apparatus for continuously rendering fat or oil from animal or vegetable matter, comprising in combination an elongated housing having an inlet and an outlet, a driven rotary conveyer worm and coacting mincing cutters in said housing, said cutters being disposed adjacent said outlet and at one end of said worm, the other end of the worm being disposed at said inlet, a hopper arranged at the inlet end of said housing and having an outlet in communication with the interior thereof, a driven rotary impeller in the hopper outlet and having spiral vanes to force the material into said worm, an elongated heating and mixing chamber to receive the material discharging from the outlet of said housing, said chamber having means for the admission of a heating fluid and also having a centrally positioned shaft extending therethrough and carrying helical ribs for mixing the material and feeding it through the chamber, a direct steam heater to receive the mixed material from said chamber, said heater embodying a valve regulated chamber with steam injector means extending therein, and pump means for forcing the material from said mixing chamber into the chamber of said heater.

2. The structure of claim 1 in which the axis of said impeller is parallel with the axis of said worm, and the width of the hopper outlet is greater than the width or diameter of said impeller, the latter being disposed in the hopper outlet closer to one of its side walls than the other, the downwardly rotating portions of the impeller vanes being opposite the more distantly positioned wall of the hopper outlet.

3. The structure of claim 1 in which the vanes of said impeller have toothed outer edges to grip the material and assist in forcing it continuously to said worm.

4. An apparatus for continuously rendering fat or oil from animal or vegetable matter, comprising in combination an elongated housing having an inlet and an outlet, a driven rotary conveyer worm and coacting mincing cutters in said housing, said cutters being disposed adjacent said outlet and at one end of said worm, the other end of the worm being disposed at said inlet, a hopper arranged at the inlet end of said housing and having an outlet in communication with the interior thereof, a shaft rotatably journaled in the walls of the hopper outlet, a feeding impeller removably attached to said shaft within the hopper outlet and somewhat spaced from the outlet wall facing the downwardly rotatable part of said impeller, a driving shaft journaled on the wall of the hopper outlet in axial alinement with the impeller shaft, means for detachably coupling said alined shafts, an elongated heating and mixing chamber to receive the material discharging from the outlet of said housing, said chamber having means for the admission of a heating fluid and also having a centrally positioned shaft extending therethrough and carrying helical ribs for mixing the material and feeding it through the chamber, a direct steam heater to receive the mixed material from said chamber, said heater embodying a valve regulated chamber with steam injector means extending therein, and pump means for forcing the material from said mixing chamber into the chamber of said heater.

5. An apparatus for continuously rendering fat or oil from animal or vegetable matter, comprising in combination an elongated housing having an inlet and an outlet, a driven rotary conveyer worm and coacting mincing cutters in said housing, said cutters being disposed adjacent said outlet and at one end of said worm, the other end of the worm being disposed at said inlet, a hopper arranged at the inlet end of said housing and having an outlet in communication with the interior thereof, a shaft rotatably journaled in the walls of the hopper outlet, an impeller removably attached to said shaft within the hopper outlet, said impeller having helical vanes with serrated edges and being spaced from the wall of the hopper outlet facing the downwardly rotatable part of the impeller, a driving shaft journaled on the wall of the hopper outlet in axial alinement with the impeller shaft, means for detachably coupling said alined shafts, an elongated heating and mixing chamber to receive the material discharging from the outlet of said housing, said chamber having means for the admission of a heating fluid and also having a centrally positioned shaft extending therethrough and carrying helical ribs for mixing the material and feeding it through the chamber, a direct steam heater to receive the mixed material from said chamber, said heater embodying a valve regulated chamber with steam injector means extending therein, and pump means for forcing the material from said mixing chamber into the chamber of said heater.

AAGE NYROP.

REFERENCES CITED

The following references are of record in the file of this patent:

UNITED STATES PATENTS

| Number | Name | Date |
| --- | --- | --- |
| 1,421,283 | Meakin | June 27, 1922 |
| 1,459,713 | Beggs | June 26, 1923 |
| 2,200,061 | Green | May 7, 1940 |